(12) United States Patent
Choy

(10) Patent No.: US 7,229,230 B2
(45) Date of Patent: Jun. 12, 2007

(54) TUBE CONNECTORS

(75) Inventor: Yau King Choy, Hong Kong (HK)

(73) Assignee: Laudex Company Limited, Hong Kong (HK)

( * ) Notice: Subject to any disclaimer, the term of this patent is extended or adjusted under 35 U.S.C. 154(b) by 230 days.

(21) Appl. No.: 10/872,201

(22) Filed: Jun. 18, 2004

(65) Prior Publication Data

US 2005/0002732 A1    Jan. 6, 2005

Related U.S. Application Data

(63) Continuation-in-part of application No. 10/144,429, filed on May 13, 2002, now abandoned, which is a continuation-in-part of application No. 09/952,442, filed on Sep. 14, 2001, now abandoned.

(51) Int. Cl.
    *F16B 7/00* (2006.01)
(52) U.S. Cl. ................................. 403/297; 403/314
(58) Field of Classification Search ............ 403/1, 403/83, 87, 109.1, 109.5, 205, 263, 264, 403/286, 292, 294, 297, 313, 314, 367–371, 403/373–374.4, 377, 379.6, 409.1
    See application file for complete search history.

(56) References Cited

U.S. PATENT DOCUMENTS

| | | | | |
|---|---|---|---|---|
| 2,508,039 | A | * | 5/1950 | Neuwirth ............... 403/369 |
| 3,695,649 | A | * | 10/1972 | Laverone ............... 403/374.4 |
| 4,856,929 | A | * | 8/1989 | Smahlik et al. ......... 403/297 |
| 4,958,953 | A | | 9/1990 | Charondiere |
| 5,259,684 | A | * | 11/1993 | Scharer ............... 403/409.1 |
| 6,202,663 | B1 | | 3/2001 | Uemura |
| 6,357,960 | B1 | * | 3/2002 | Cornelius et al. ...... 403/374.1 |

FOREIGN PATENT DOCUMENTS

| | | |
|---|---|---|
| DE | 8097657 | 8/1989 |
| DE | 9410897 | 7/1994 |
| DE | 19514752 | 10/1996 |
| DE | 29813772 | 1/1998 |
| FR | 2214497 | 8/1974 |
| GB | 1515297 | 6/1978 |
| GB | 2093517 | 9/1982 |

* cited by examiner

*Primary Examiner*—Daniel P. Stodola
*Assistant Examiner*—Victor MacArthur
(74) *Attorney, Agent, or Firm*—Jackson Walker, LLP

(57) ABSTRACT

A tube connector includes an anchor body having a lengthwise through-passage and a bolt head cavity. The through-passage and bolt head cavity are open to a side of the anchor body. One end of the anchor body has a tool-access opening and the other end has a tapered portion. A bolt extends through the tapered end portion and has its head located in the bolt head cavity. The bold is inserted into the anchor body via the side opening. A tightening body has a lengthwise through-passage through which the bolt extends and a tapered end portion facing the tapered end portion of the anchor body. A nut engages upon the bolt, and an expansion body has a pair of opposed inward facing ramp surfaces, one of which bears against the tapered portion of the anchor body and the other of which bears against the tapered portion of the tightening body. Upon relative rotation between the bolt and nut the tightening body moves toward the anchor body to expand the expansion body against an internal surface of the tube end.

4 Claims, 5 Drawing Sheets

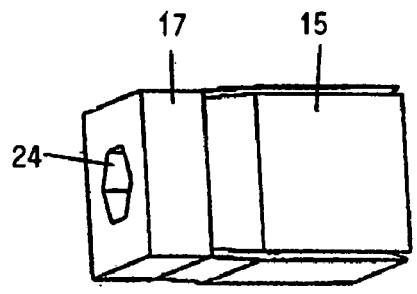
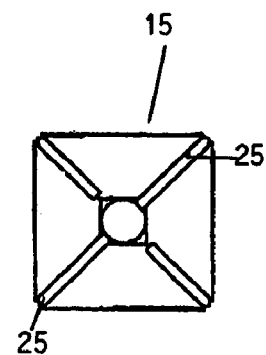
FIG. 6
FIG. 7
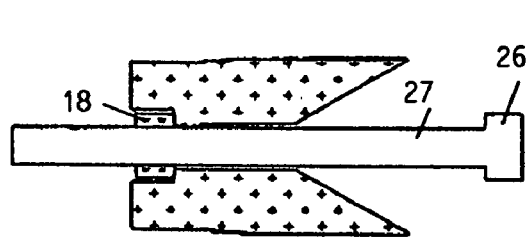
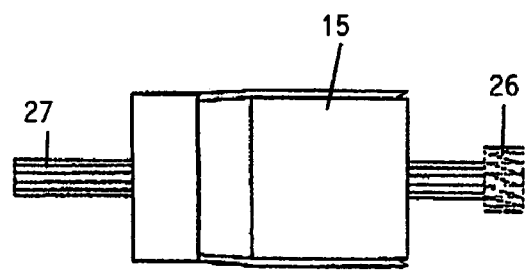
FIG. 8
FIG. 9

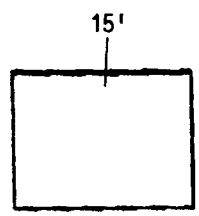
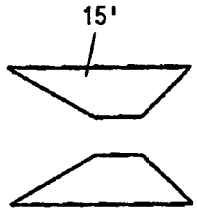
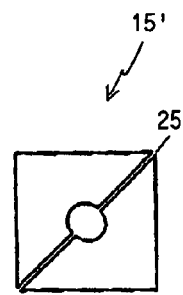
FIG. 13  FIG. 14  FIG. 15
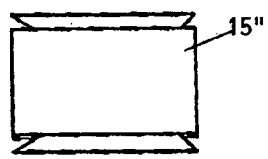
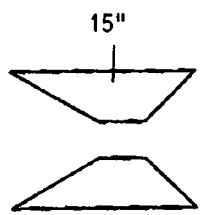
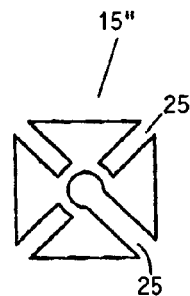
FIG. 16  FIG. 17  FIG. 18
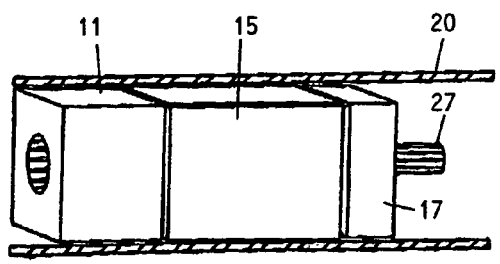
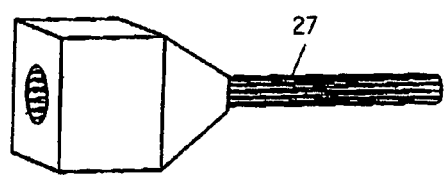
FIG. 19  FIG. 20

TUBE CONNECTORS

This is a continuation-in-part application based upon U.S. patent application Ser. No. 10/144,429, filed May 13, 2002 now abandoned, which was a continuation-in-part application of U.S. patent application Ser. No. 09/952,442, filed Sep. 14, 2001, now abandoned.

BACKGROUND OF THE INVENTION

The present invention relates to tube connectors. More particularly, although not exclusively, the invention relates to connectors for securing a pair of tubes in end-to-end configuration, or for securing three or more tubes radiating from the connector in one or more planes. Such connectors might have application in shelving, metal framework such as scaffolding, and furniture construction for example.

Known connectors for securing tubes in end-to-end configuration can be complex in design and implementation.

OBJECT OF THE INVENTION

It is the object of the present invention to overcome or substantially ameliorate the above disadvantage and/or more generally to provide an improved tube connector comprising parts that bear tightly against internal surfaces of tube ends upon simple turning of an easy-access, internally captured bolt.

DISCLOSURE OF THE INVENTION

There is disclosed herein a tube connector for internal attachment to a tube end, comprising:
  an anchor body having a lengthwise through-passage and a bolt head cavity contiguous with and wider than the through-passage, the through-passage and bolt head cavity being open to a side of the anchor body at a side opening, one end of the anchor body comprising a tool-access opening contiguous with the bolt head cavity and the other end of the anchor body comprising a tapered portion,
  a bolt comprising a threaded shank located in the through-passage and extending longitudinally through the tapered end portion of the anchor body and a head located in the bolt head cavity, the bolt having been inserted into the anchor body via the side opening,
  a tightening body having a lengthwise through-passage through which the shank extends and a tapered end portion facing the tapered end portion of the anchor body,
  a nut bearing against or formed integrally with the tightening body and threadably engaged upon the shank, and
  an expansion body comprising a through-passage through which the shank extends and comprising a pair of opposed inward facing ramp surfaces, one of which bears against the tapered portion of the anchor body and the other of which bears against the tapered portion of the tightening body, whereupon relative rotation between the bolt and nut, the tightening body moves toward the anchor body to expand the expansion body against an internal surface of the tube end.

Preferably, the expansion body comprises one or more radial slots.

The connector might be adapted for connecting a pair of tubes in the end-to-end configuration, in which case the connector would comprise a pair of said anchor bodies extending in different directions, each anchor body having a corresponding said bolt, tightening body, nut and expansion body for expansion into respective internal surfaces of the pair of tube ends.

The connector might alternatively be adapted for connecting proximal end portions of three or more tubes, in which case the connector would comprise three or more of said anchor bodies extending in different directions, each anchor body having a corresponding said bolt, tightening body, nut and expansion body for expansion into respective internal surfaces of the tube proximal ends.

BRIEF DESCRIPTION OF THE DRAWINGS

Preferred forms of the present invention will now be described by way of example with reference to the accompanying drawings, wherein:

FIG. 6 is a schematic perspective illustration of parts of another tube connector, FIG. 7 is a schematic and elevation of the parts shown in FIG. 6, FIG. 8 is a schematic cross-sectional elevation of components of another tube connector, FIG. 9 is a schematic elevation of the components of FIG. 8, FIG. 13 is a schematic elevation of an alternative expansion member, FIG. 14 is a schematic cross-sectional elevation of the expansion member of FIG. 13, FIG. 15 is a schematic end elevation of the expansion member of FIGS. 13 and 14, FIG. 16 is a schematic elevation of another alternative expansion member, FIG. 17 is a schematic cross-sectional elevation of the expansion member of FIG. 16, FIG. 18 is a schematic end elevation of the expansion member of FIGS. 15 and 16, FIG. 19 is a schematic perspective/cross-sectional stylised illustration of an alternative connector in an end portion of the tube, and FIG. 20 is a schematic perspective illustration of parts of the connector of FIG. 19.

DESCRIPTION OF THE PREFERRED EMBODIMENTS

Figure 1:
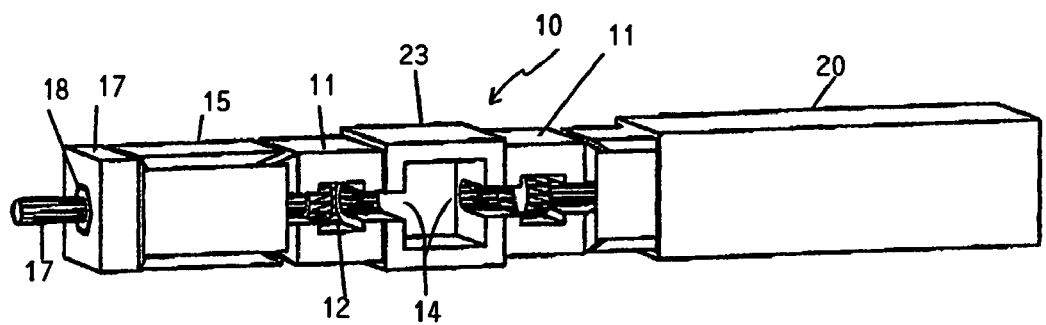
FIG. 1 is a schematic perspective illustration of an assembly of tube connectors.
Figure 2:
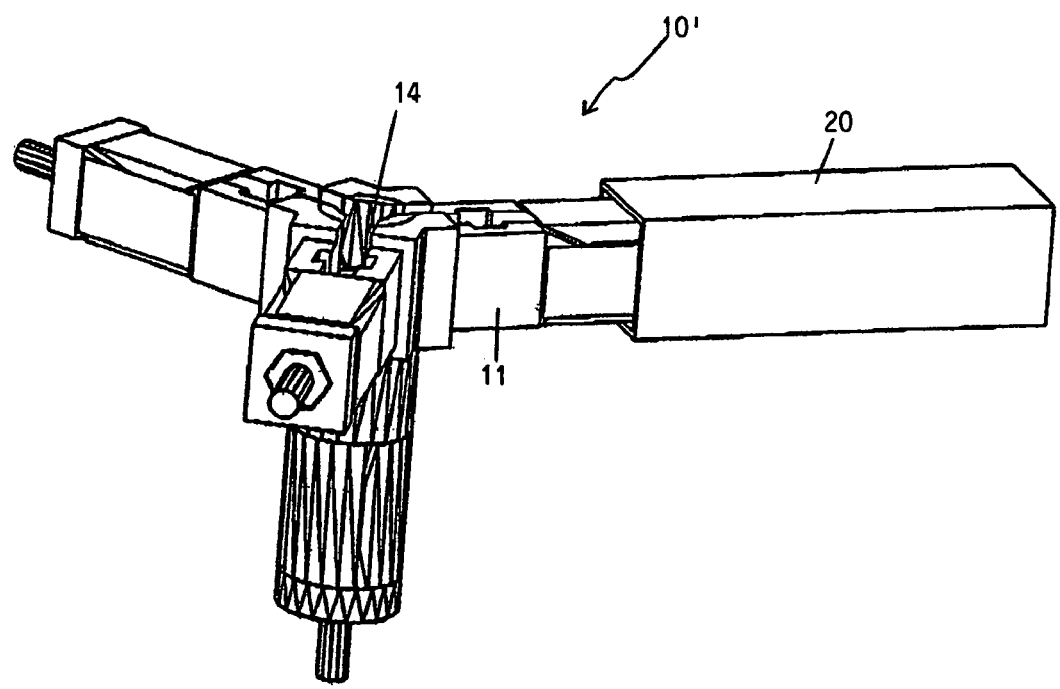
FIG. 2 is a schematic perspective illustration of a four arm tube connector.
Figure 3:
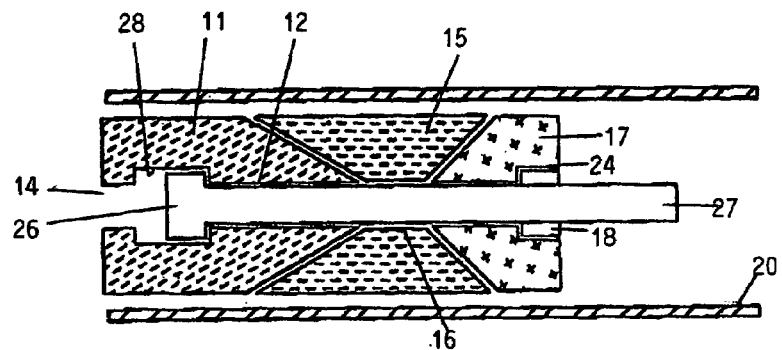
FIG. 3 is a schematic cross-sectional elevation of a tube connector in an end portion of the tube.
Figure 4:
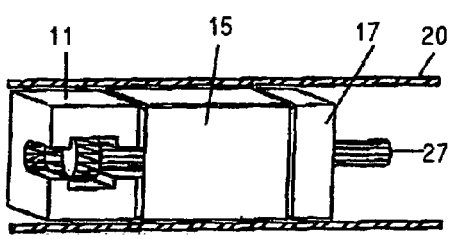
FIG. 4 is a schematic perspective stylised cross-sectional illustration of the tube connector of FIG. 3 in and end portion of a tube.
Figure 5:
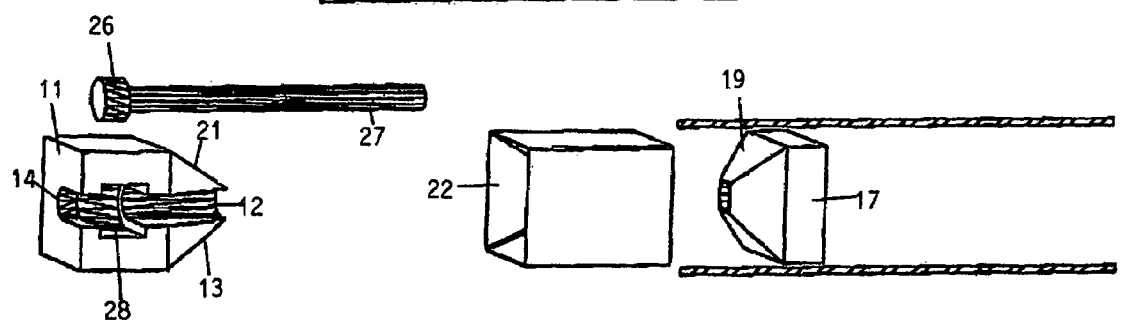
FIG. 5 is a schematic parts-exploded perspective stylized illustration of the components of FIG. 3 and FIG. 4.
Figures 10, 11, 12:
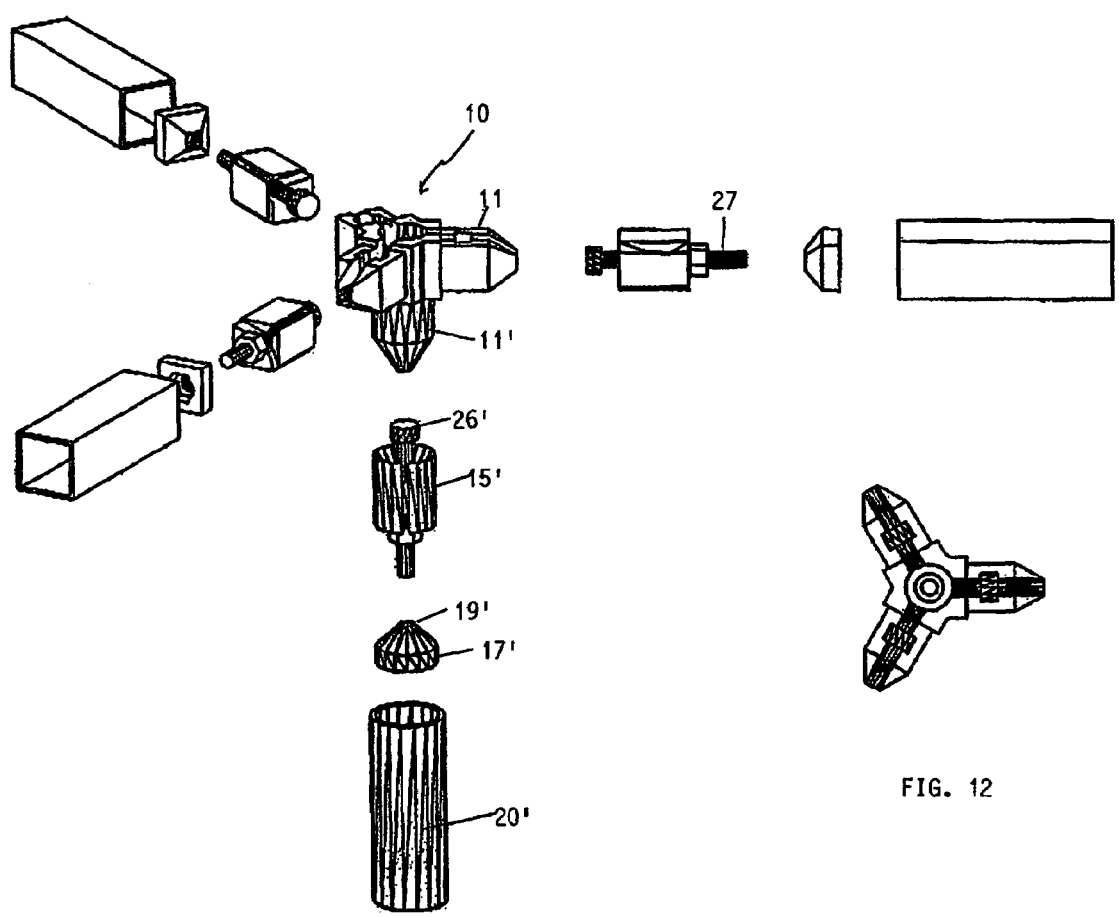
FIG. 10 is a schematic elevation of the four arm connector of FIG. 2.
FIG. 11 is a schematic parts-exploded perspective illustration of the four arm connector of FIG. 10.
FIG. 12 is a schematic plan view of the four arm connector of FIG. 11.

In FIG. 1 of the accompanying drawings there is depicted schematically a series of components adapted to connect a pair of tubes 20 (only one of which is shown) in end-to-end configuration. The connector 10 comprises a pair of anchor bodies 11 extending from opposite ends of a common box section 23. Each anchor body 11, as better illustrated in FIG. 3, comprises a through-passage 12 and an enlarged bolt head cavity 28. There is a tool-access opening 14 in one end of the anchor body 11. Located within the through-passage 12 is a shank of a bolt 27 having a bolt head 26 residing within the bolt head cavity 28. As shown in FIG. 1, the tool access opening 14, the bolt head cavity 28 and the through-passage 12 open to a side of the anchor body. This side opening enables easy side-insertion of the bolt into the anchor body. The end of the anchor body 11 opposite the tool access opening 14 is tapered as shown at 21 in FIG. 5.

There is a tightening body 17 having a hexagonal nut recess 24 through which the bolt 27 passes. The tightening body 17 has a tapered end portion 19 that faces towards the tapered end portion 21 of the anchor body 11. Situated between these mutually facing tapered end portions is an expansion body 15 having at each of its ends internal ramp surfaces 22 that bear against the respective tapered end portions of the anchor body and tightening body. As shown in various configurations in FIGS. 7, 15 and 18, the expansion body 15, 15' or 15" as the case may be, is designed to expand by the provision of radiating slots 25. In the embodiment of FIG. 15, the slots 25 passes the whole way through the expansion body 15' to divide that body into two mirror parts. In each embodiment, the expansion body expands outwardly against the internal surface of a tube 20 as the tightening body 17 is drawn toward the anchor body 11, thereby opening out the slots 25. To this end, the hexagonal recess 24 receives a nut 18 that is threadably engaged upon the shank of the bolt 27. The bolt head 26 would have an Alan Key recess (not shown) to receive an Alan key via the tool access opening 14. Upon turning of the bolt 27, the nut does not turned as it is retained within the hexagonal recess 24. A degree of static friction between the tightening body 17 and expansion body 15 and in turn between the expansion body 15 and the anchor body 11, prevents rotation of the tightening body 17. Upon turning of the bolt, the nut 18 is drawn towards the bolt head 26. During this time, the expansion body 15 presses tightly against the internal surface of the tube 20 to retain the tube in fixed disposition with respect to the anchor body 11.

As shown in FIGS. 2, 10, 11 and 12, a number of anchor bodies 11 can radiate integrally from a common connector 10'. In this particular embodiment, there are three in-plane radiating square cross-sectioned tubes 20 connected to the connector so as to extend radially from the longitudinal axis of a central vertical circular tube. The side/top-access bolt insertion openings are clearly shown in FIG. 2 and the central opening 14 provides tool-access to the bolt heads of three in-plane radiating bolts associated with the respective anchor bodies 11.

It should be appreciated that modifications and alterations obvious to those skilled in the art are not to be considered as beyond the scope of the present invention. Some such variations are shown for example in FIGS. 6 and 8 for illustration purposes only and shall not be described in detail.

The invention claimed is:

1. A tube connector for internal attachment to a tube end, comprising:

an anchor body having a lengthwise through-passage extending along a longitudinal axis of the anchor body and a bolt head cavity contiguous with and wider than the through-passage, the through-passage and bolt head cavity being open to a longitudinal side of the anchor body providing a longitudinal side opening, the side opening open in a direction perpendicular to the longitudinal axis of the anchor body, the through-passage being a groove-shaped through-passage, one end of the anchor body comprising a tool-access opening contiguous with the bolt head cavity and the other end of the anchor body comprising a tapered portion, a bolt comprising a threaded shank located in the through-passage and extending longitudinally through the tapered end portion of the anchor body and a head located in the bolt head cavity, the bolt insertable into the anchor body from a direction perpendicular to the longitudinal axis of the anchor body via the longitudinal side opening into the through-passage, a tightening body having a lengthwise through-passage through which the shank extends and a tapered end portion facing the tapered end portion of the anchor body, a nut bearing against or formed integrally with the tightening body and threadably engaged upon the shank, and an expansion body comprising a through-passage through which the shank extends and comprising a pair of opposed inward facing ramp surfaces, one of which bears against the tapered portion of the anchor body and the other of which bears against the tapered portion of the tightening body, whereupon relative rotation between the bolt and nut, the tightening body moves toward the anchor body to expand the expansion body against an internal surface of the tube end.

2. The tube connector of claim 1, wherein the expansion body comprises one or more radial slots.

3. The tube connector of claim 1 for connecting a pair of tubes in the end-to-end configuration, comprising a pair of said anchor bodies extending in different directions, each anchor body having a corresponding said bolt, tightening body, nut and expansion body for expansion into respective internal surfaces of the pair of tube ends.

4. The tube connector of claim 1 for connecting proximal end portions of three or more tubes, comprising a three or more of said anchor bodies extending in different directions, each anchor body having a corresponding said bolt, tightening body, nut and expansion body for expansion into respective internal surfaces of the tube proximal ends.

* * * * *